Figure 3:
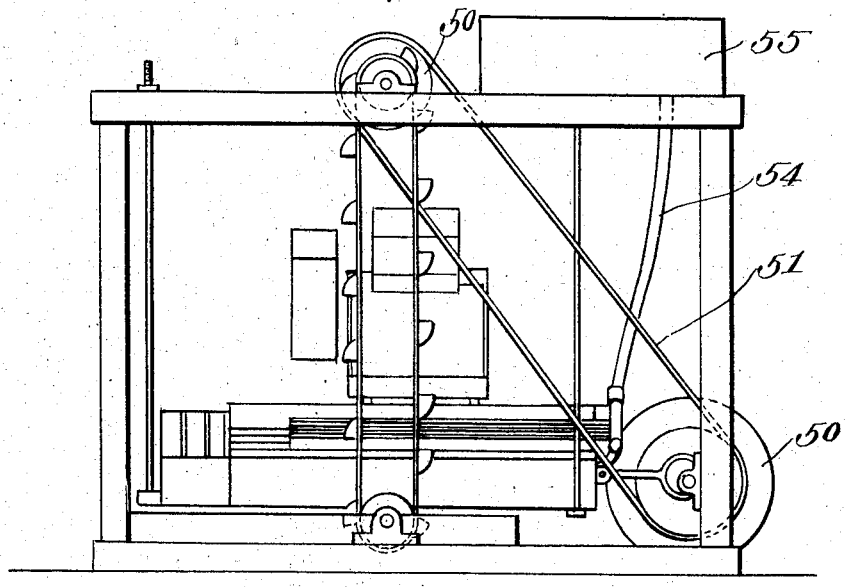

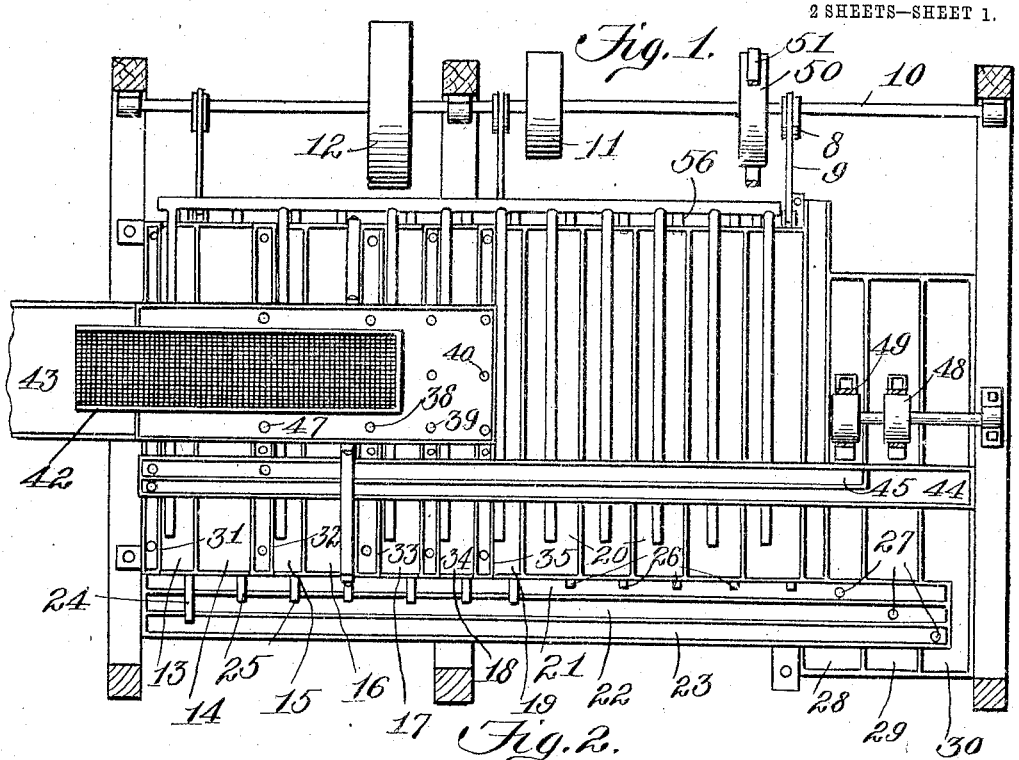
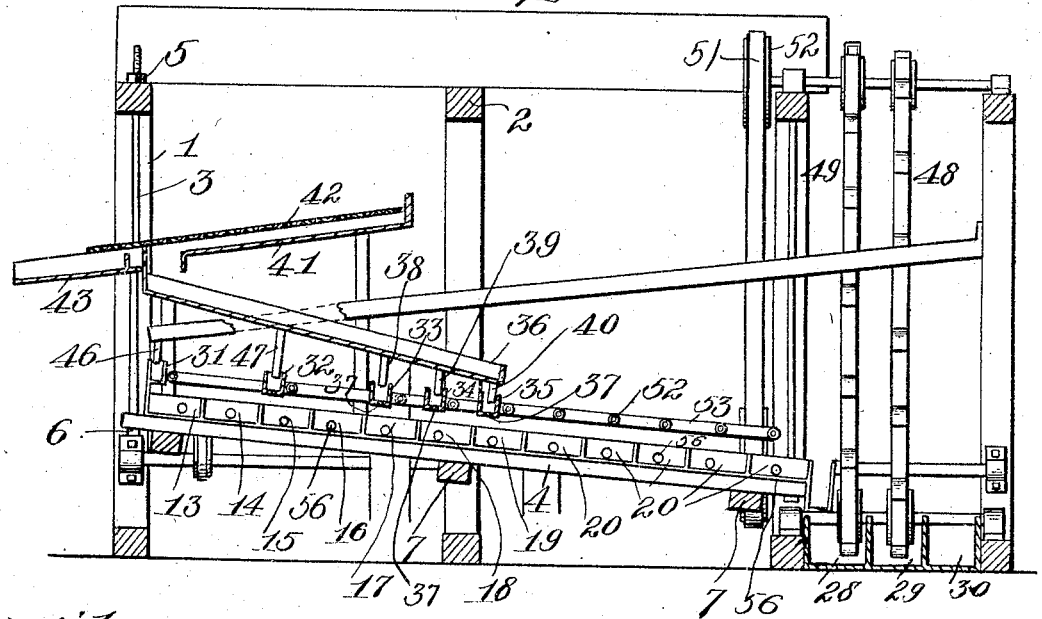

No. 790,156. PATENTED MAY 16, 1905.
W. M. REELY.
ORE CONCENTRATOR.
APPLICATION FILED OCT. 19, 1904.

2 SHEETS—SHEET 2.

Witnesses:
C. D. Kesler
John Brown

Inventor
William M. Reely
By James L. Norris
Attys.

No. 790,156. Patented May 16, 1905.

UNITED STATES PATENT OFFICE.

WILLIAM M. REELY, OF MISSOULA, MONTANA.

ORE-CONCENTRATOR.

SPECIFICATION forming part of Letters Patent No. 790,156, dated May 16, 1905.

Application filed October 19, 1904. Serial No. 229,165.

*To all whom it may concern:*

Be it known that I, WILLIAM M. REELY, a citizen of the United States, residing at Missoula, in the county of Missoula and State of Montana, have invented new and useful Improvements in Ore-Concentrators, of which the following is a specification.

This invention relates to ore-concentrators, and the object thereof is to provide new and novel means hereinafter more specifically described for concentrating coarse or pulverized ores or other material containing mineral values and effecting a separation of said values from the gangue.

The invention further aims to provide an ore-concentrator adapted for the concentrating of coarse or pulverized ore or other material containing mineral values, and which is based on the principle of panning where the tendency is for the concentrates to precipitate to the bottom of the pan, while the lighter material flows over the top edge of the pan into an adjacent pan below, and where the partly-cleaned concentrates are worked over in separate pans and are not allowed to again mix with the pulp and muddy water.

A further object of the invention is to construct an ore-concentrator with a plurality of pans, so that the pans will have a tendency to hold the concentrates as near to where they first strike the table as is possible and to pass the waste matters on. This is accomplished by imparting a gentle even motion to the table, so that the concentrates will immediately settle to the bottom of the pan to which they are fed and remain within the pan until it is emptied in a manner to be hereinafter more specifically set forth. Any of the concentrates which escape from the first pan will find lodgment in the pans below, the tendency being that the heaviest material will precipitate to the bottom of the pan and crowd the lighter material to the top, where it will flow over into the adjacent pan below and eventually escape into the waste-sluice at the foot of the table.

The invention further aims to construct an ore-concentrator which shall be simple in its construction, strong, durable, efficient in its use, and comparatively inexpensive to set up.

With the foregoing and other objects in view the invention consists of the novel construction, combination, and arrangement of parts hereinafter more specifically described, and illustrated in the accompanying drawings, which form a part of this specification, and wherein I have shown the preferred embodiment of my invention; but it is to be understood that I may make changes, variations, and modifications therein as come properly within the scope of the claims hereunto appended.

Figure 4:
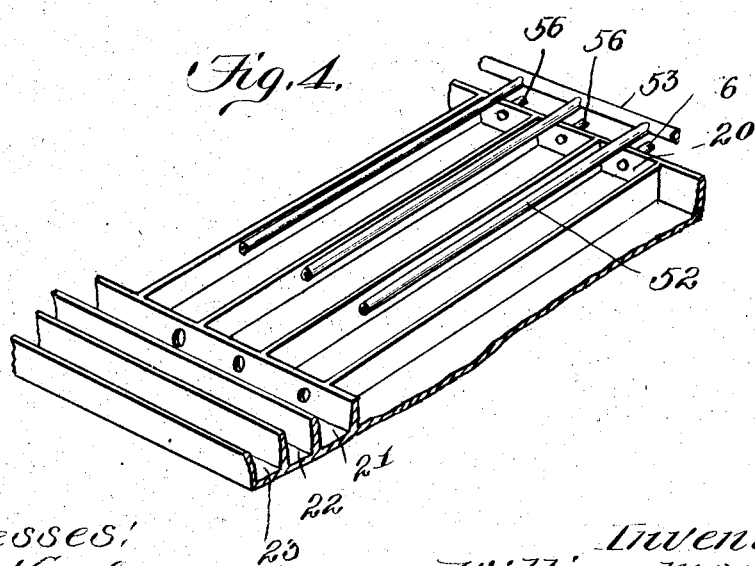

In the drawings, Figure 1 is a top plan view of an ore-concentrator constructed in accordance with this invention. Fig. 2 is a longitudinal sectional view thereof. Fig. 3 is an end elevation, and Fig. 4 is a perspective view of a plurality of pans arranged in series.

Referring to the drawings, wherein like reference characters denote corresponding parts throughout the several views, a frame is provided for supporting the various portions of the concentrator and which consists of the vertically and horizontally extending bars 1 2, suitably connected together. Suspended within the frame through the medium of a plurality of vertically-extending adjustable rods 3, formed of spring metal, is a table 4. The rods 3 are adjustably secured at their upper ends to the horizontally-extending bars 2 through the medium of the adjusting-nuts 5, and said rods 3 are secured in any suitable manner to the table 4, as at 6. The rods 3 are adapted to suspend the table 4 within the frame at an inclination, and owing to the employment of the adjusting-nuts in connection with the adjustable rods 3 the pitch of the table 4 can be varied. The table 4 is reinforced through the medium of the brace members 7, which are secured to the lower face of said table. The latter is given an even reciprocating movement through the medium of the eccentrics 8, connected with one side of the table, as at 9. The eccentrics 8 are mounted upon the shaft 10, carrying a pulley 11, so said shaft 10 can be connected with a power-transmitting device, and said shaft 10 also carries a fly-wheel 12, which insures an even motion to the table 4.

The table 4 has its upper face provided with a series of pans 13, 14, 15, 16, 17, 18, 19, and 20, which may be constructed in any suitable manner and of any suitable material, and arranged at one side of said pans 13 to 20 is a series of longitudinally-extending sluiceways 21, 22, and 23. The pan 13 communicates with the sluiceway 23 through the medium of an outlet-pipe 24, having a suitable cut-off. The pans 14, 15, 16, 17, 18, and 19 each communicate with the sluiceway 22 through the medium of an outlet-pipe 25, having a suitable cut-off. The pans 20 communicate with a sluiceway 21 by the outlet-pipes 26 and which have suitable cut-offs. The sluiceways 21, 22, and 23 extend at an inclination and each has its lower end provided with an outlet 27. The lower ends of the sluiceways 21, 22, and 23 extend over the gathering-boxes 28 and 29 and also the reservoir or concentrate-receptacle 30. The sluiceway 21 communicates through the medium of its outlet 27 with the gathering-box 28, the sluiceway 22 communicates through the medium of its outlet 27 with the gathering-box 29, and the sluiceway 23 communicates through the medium of its outlet 27 with the reservoir or concentrate-receptacle 30.

Arranged within the frame and above the table 4 is a series of distributing-boxes 31, 32, 33, 34, and 35, the box 31 being positioned over the pan 13 at one side thereof, the box 32 being positioned over the pan 15 at one side thereof, the box 33 being positioned over the pan 17 at one side thereof, the box 34 being positioned over the pan 18 at one side thereof, and the box 35 being positioned over the pan 19 at one side thereof. Arranged over the boxes 33, 34, and 35 is an inclined chute 36, which is adapted to feed the material to the distributing-boxes 33, 34, and 35 in a manner as hereinafter referred to, and from said distributing-boxes 33, 34, and 35 the material is discharged into the pans 17, 18, and 19. The distributing-boxes 33, 34, and 35 are provided with outlet-openings 37 to permit of the material being discharged therefrom into the pans 17, 18, and 19. The material is discharged from the chute into the boxes 33, 34, and 35 by means of a series of pipes 38, which open into the box 33, a series of pipes 39, which open into the box 34, and a series of pipes 40, which open into the box 35. Arranged over the chute 36 is a feed-chute 41 therefor, the latter being arranged below a screening device 42, so that when the material to be treated is screened the screened material is discharged through the medium of said chute 41 onto the chute 36, where it is supplied to the distributing-boxes 33, 34, and 35. The screening device 42 extends over a sorting-table 43, which receives the coarse material from said screening device 42, while the finer material passes through the screen and onto the chute 41. The screening device 42, chutes 41 and 36, as well as the boxes 33, 34, and 35, are connected with the table 4, so that when the table 4 has motion imparted thereto through the medium of the eccentrics 8 motion will also be imparted to the chutes, screening device, and boxes. Arranged over the pans and extending at an inclination in an opposite direction with respect to that of the chute 36 is a pair of sluiceways 44 45. These sluiceways 44 45 also extend over the gathering-boxes 28 29 and concentrate-receptacle 30, as well as extend substantially the entire length of the frame to and over the pan 13. The sluiceway 44 communicates with the distributing-box 31 through the medium of the outlet-pipe 46, and the sluiceway 45 communicates with the distributing-box 32 through the medium of the outlet-pipe 47. Arranged at one side of those ends of the sluiceways 44 45 which extend over the gathering-boxes 28 29 is a pair of elevators 48 49, operated through the medium of the pulley-and-belt connection 50 51 with the shaft 10. The function of the elevator 48 is to elevate the material from the box 39 and deposit it upon the sluiceway 44, and the function of the elevator 49 is to elevate the material from the box 38 and deposit it upon the sluiceway 45.

Arranged over the pans 13, 15, 17, 18, and 19 and each of the pans 20 is a perforated water-supply pipe 52, which communicates with a water-feed pipe 53, the latter connected by a flexible pipe 54 with the water-reservoir 55, supported upon the frame. Extending within each of the pans is a flushing-pipe 56, which also communicates with the pipe 53.

The operation of the apparatus is as follows: The material to be concentrated is deposited on the screen 42. The coarse material passes over the screen onto the sorting-table 43. The fine material passes through the screen onto the chute 41 and is carried by the chute 36 to the distributing-box 33, and from there it is emptied into the pan 17, and owing to the motion of the table 4 the heavy material precipitates to the bottom of the pan 17 and the light material flows over into the pan below. During this operation water is supplied to the pans through the medium of the pipes 52. When the pan 17 becomes well charged, the material is turned into the distributing-box 34. The pan 17 is then emptied, which is accomplished by opening its respective flushing-pipe 56. The flushing of the pan 17 causes the concentrates to flow into the sluiceway 22, the outlet-pipe 25 of the pan 17 being open for this purpose. The concentrates are conveyed through the medium of the sluiceway 22 into the gathering-box 29, from where they are lifted through the medium of the elevator 48 and deposited upon sluiceway 44, and through the medium of the sluiceway 44 conveyed into the distributing-box 31, and from there discharged into the pan 13. The concentrates are discharged from the pan 13 by opening the respective flushing-pipe 56 therefor, which causes the concentrates to be discharged into the sluiceway 23, and through the medium of said sluiceway 23 are discharged into the reservoir or concentrate-receptacle 30. The operation in connection with pans 18 and 19 when concentrating is the same as that in connection with the operation set forth in reference to the pan 17. When it is necessary to empty the lower pans—that is, the series of pans 20—which will not be often, as the bulk of the concentrates will be caught in the pans 17, 18, and 19, the operation is accomplished in the same manner as hereinbefore set forth, with the exception that the pulp passes down the sluiceway 21 and empties into the box 28, from where it is taken by the elevator 49 and deposited into the sluiceway 45, which conveys it to the distributing-box 32, from where it is discharged into the pan 15. The contents of the pan 13, being the clean concentrates, are emptied into the receptacle 30, the concentrates of pans 14, 15, 16, 17, 18, and 19, being only partly clean, are returned to pan 13 and are worked again in the manner as hereinbefore set forth. The contents of pans 20, which are principally waste, are conveyed to the pan 13 and are not allowed to mix with either the clean concentrates or the muddy water or pulp.

The apparatus can also be used for working dry material, and in such case the water-pipes can be dispensed with and the table set on a steeper grade; otherwise the operation will be the same as hereinbefore referred to.

One of the advantages set up by the apparatus is that two or more pans may be reserved at the head of the table for the purpose of working over the middlings, thus avoiding the mixing of said middlings with the muddy water and pulp, as is the case where the middlings are conveyed back to the head of the table and worked over.

Having thus fully described my invention, what I claim as new, and desire to secure by Letters Patent, is—

1. A concentrating apparatus involving a reciprocatory and vertically-adjustable inclined table provided with a series of pans, a series of sluiceways arranged at one side of and communicating with said pans, and a pair of sluiceways arranged over said table and communicating with a plurality of the pans at one end of said series of pans, combined with means for feeding the material to be concentrated to the pans independent of the said plurality of pans, and means for transferring the material conveyed by certain of the sluiceways of said series of sluiceways to the said plurality of sluiceways.

2. A concentrating apparatus involving a reciprocatory and vertically-adjustable inclined table provided with a series of pans, a series of sluiceways arranged at one side of and communicating with said pans, and a pair of sluiceways arranged over said table and communicating with a plurality of the pans at one end of said series of pans, combined with means for feeding the material to be concentrated to the pans independent of the said plurality of pans, means for transferring the material conveyed by certain of the sluiceways of said series of sluiceways to the said plurality of sluiceways, and water-supply and washing means arranged in operative relation with respect to said series of pans.

3. A concentrating apparatus involving a reciprocatory and vertically-adjustable inclined table provided with a series of pans, and a series of sluiceways arranged at one side of and communicating with said pans, a stationary pair of sluiceways arranged over said table and communicating with a plurality of the pans at one end of said series of pans, combined with means for feeding the material to be concentrated to a plurality of pans independently of the first-mentioned plurality of pans, and means for transferring the material conveyed by certain of said sluiceways of said series of sluiceways to the said plurality of sluiceways.

4. A concentrating apparatus involving a reciprocatory and vertically-adjustable inclined table provided with a series of pans, and a series of sluiceways arranged at one side of and communicating with said pans, a stationary pair of sluiceways arranged over said table and communicating with a plurality of the pans at one end of said series of pans, combined with means for feeding the material to be concentrated to a plurality of pans independently of the first-mentioned plurality of pans, means for transferring the material conveyed by certain of said sluiceways of said series of sluiceways to the said plurality of sluiceways, and water-supply and flushing means arranged in operative relation with respect to said series of pans.

5. A concentrating apparatus involving a reciprocatory, vertically-adjustable and bodily-movable series of pans, three sluiceways arranged at one side of said pans and bodily movable therewith, the outer of said sluiceways adapted to communicate with one of said pans at the upper end of said series of pans, the intermediate sluiceway adapted to communicate with a plurality of pans below the pans at the upper end of the said series of pans, and the inner of said sluiceways adapted to communicate with the remainder of said pans at the lower end of said series of pans, said sluiceways adapted to convey treated material from their respective pans, a pair of gathering-boxes, one of said boxes adapted to receive material conveyed by the inner of said sluiceways and the other of said boxes adapted to receive the material conveyed by said inner sluiceways, a concentrator-receptacle adapted to receive the concentrates conveyed by the outer of said sluiceways, a pair of sluiceways adapted to convey material to a plurality of pans at the upper end of said series of pans, elevators for transferring the material from the gathering-box of said pair of sluiceways, and means for feeding the material to be concentrated to a plurality of pans removed from the upper end of said series of pans, said means arranged over the pans, supported thereby and bodily movable therewith.

6. A concentrating apparatus involving a reciprocatory, vertically-adjustable and bodily-movable series of pans, three sluiceways arranged at one side of said pans and bodily movable therewith, the outer of said sluiceways adapted to communicate with one of said pans at the upper end of said series of pans, the intermediate sluiceway adapted to communicate with a plurality of pans below the pans at the upper end of the said series of pans, and the inner of said sluiceways adapted to communicate with the remainder of said pans at the lower end of said series of pans, said sluiceways adapted to convey treated material from their respective pans, a pair of gathering-boxes, one of said boxes adapted to receive material conveyed by the inner of said sluiceways and the other of said boxes adapted to receive the material conveyed by said inner sluiceways, a concentrate-receptacle adapted to receive the concentrates conveyed by the outer of said sluiceways, a pair of sluiceways adapted to convey material to a plurality of pans at the upper end of said series of pans, elevators for transferring the material from the gathering-boxes to said pair of sluiceways, means for feeding the material to be concentrated to a plurality of pans removed from the upper end of said series of pans, said means arranged over the pans, supported thereby and bodily movable therewith, and water-supply and flushing means arranged in operative relation with respect to said series of pans.

7. A concentrating apparatus involving a plurality of bodily-movable and reciprocatory pans suspended at an inclination, means for suspending and bodily adjusting the pitch of said pans, a plurality of reciprocatory distributers arranged over and in operative relation with respect to said pans, a reciprocatory means for supplying the material to be treated to certain of said distributers, a plurality of sluiceways communicating with said pans for conveying treated material therefrom, means for elevating and transferring to the other of said distributers, the material conveyed by certain of said sluiceways, said last-mentioned distributers adapted to feed the treated material to certain of the pans at one end of said plurality of pans, and means for receiving the material conveyed by the other of said sluiceways.

8. A concentrating apparatus involving a plurality of bodily-movable and reciprocatory pans suspended at an inclination, means for suspending and bodily adjusting the pitch of said pans, a plurality of reciprocatory distributers arranged over and in operative relation with respect to said pans, a reciprocatory means for supplying the material to be treated to certain of said distributers, a plurality of sluiceways communicating with said pans for conveying treated material therefrom, means for elevating and transferring to the other of said distributers the material conveyed by certain of said sluiceways, said last-mentioned distributers adapted to feed the treated material to certain of the pans at one end of said plurality of pans, means for receiving the material conveyed by the other of said sluiceways, water-supply pipes mounted in operative relation with respect to said pans, and flushing-pipes extending in said pans at one side thereof.

9. An ore-concentrating apparatus involving a reciprocatory and adjustable table provided with a series of pans, a pair of gathering-boxes, a concentrate-receptacle, a series of inclined sluiceways arranged at one side of said pans and extending over and communicating with said boxes and receptacles, one of said pans opening into one of said sluiceways and the other of said pans opening into the other of said sluiceways, a plurality of distributers arranged over said pans, a pair of inclined sluiceways extending in an opposite direction with respect to said series of sluiceways and communicating with a pair of said distributers, a screening device, a feeding-chute opening into the other of said distributers and adapted to receive the screened material from the screening device, water-supply pipes arranged over said pans, flushing-pipes opening into said pans, and a pair of elevators extending in said gathering-boxes and arranged in operative relation with respect to said pair of sluiceways.

10. An ore-concentrating apparatus involving a reciprocatory and bodily-movable series of pans, a series of reciprocatory distributers suitably arranged over said pans and adapted to distribute material to the pans, means for conveying treated material from certain of said pans to certain of said distributers, reciprocatory means for supplying the material to be treated to the other of said distributers, and means for conveying the completely-treated material from one of said pans.

In testimony whereof I have hereunto set my hand in presence of two subscribing witnesses.

WILLIAM M. REELY.

Witnesses:
J. ALAN ANDREW,
P. J. KLINE.